United States Patent
Keshet et al.

(10) Patent No.: US 10,637,878 B2
(45) Date of Patent: Apr. 28, 2020

(54) MULTI-DIMENSIONAL DATA SAMPLES REPRESENTING ANOMALOUS ENTITIES

(71) Applicant: HEWLETT PACKARD ENTERPRISE DEVELOPMENT LP, Houston, TX (US)

(72) Inventors: Renato Keshet, Haifa (IL); Yaniv Sabo, Haifa (IL)

(73) Assignee: MICRO FOCUS LLC, Santa Clara, CA (US)

(*) Notice: Subject to any disclaimer, the term of this patent is extended or adjusted under 35 U.S.C. 154(b) by 155 days.

(21) Appl. No.: 15/445,477

(22) Filed: Feb. 28, 2017

(65) Prior Publication Data
US 2018/0248900 A1 Aug. 30, 2018

(51) Int. Cl.
| G06F 21/00 | (2013.01) |
| H04L 29/06 | (2006.01) |
| G06F 21/55 | (2013.01) |
| G06N 20/10 | (2019.01) |
| G05B 23/02 | (2006.01) |
| G05D 7/06 | (2006.01) |

(52) U.S. Cl.
CPC ........ H04L 63/1425 (2013.01); G06F 21/552 (2013.01); G06N 20/10 (2019.01)

(58) Field of Classification Search
CPC ........................ H04L 63/1425; G06F 21/552
See application file for complete search history.

(56) References Cited

U.S. PATENT DOCUMENTS

| 6,134,541 A | 10/2000 | Castelli et al. |
| 8,544,087 B1 | 9/2013 | Eskin et al. |
| 9,043,253 B2 | 5/2015 | Sreedharan |
| 2014/0058705 A1 | 2/2014 | Brill |
| 2016/0142435 A1* | 5/2016 | Bernstein ............ H04L 63/1441 726/23 |

(Continued)

FOREIGN PATENT DOCUMENTS

| EP | 3379360 A2 * | 9/2018 | ............... G01D 3/08 |
| WO | WO-2017027003 | 2/2017 | |

OTHER PUBLICATIONS

Hongtao Wang, Pan Su, Miao Zhao, Hongmei Wang, Gang Li; "Multi-View Group Anomaly Detection"; Oct. 2018; CIKM '18: Proceedings of the 27th ACM International Conference on Information and Knowledge Management; pp. 277-286 (Year: 2018).*

(Continued)

*Primary Examiner* — Kendall Dolly
*Assistant Examiner* — Courtney D Fields

(57) ABSTRACT

In some examples, a plurality of multi-dimensional data samples representing respective behaviors of entities in a computing environment are sorted, where the sorting is based on values of dimensions of each respective multi-dimensional data sample. For a given multi-dimensional data sample, a subset of the plurality of multi-dimensional data samples is selected based on the sorting. An anomaly indication is computed for the given multi-dimensional data sample based on applying a function on the multi-dimensional data samples in the subset. It is determined whether the given multi-dimensional data sample represents an anomalous entity in the computing environment based on the computed anomaly indication.

15 Claims, 3 Drawing Sheets

(56) References Cited

U.S. PATENT DOCUMENTS

2016/0253598 A1* 9/2016 Yamada ............... G06N 99/005
706/12
2017/0192872 A1 7/2017 Awad

OTHER PUBLICATIONS

Tomas Pevny, "Anomaly Detection by Bagging," Aug. 13, 2013, pp. 1-16, Available at: <ecmlpkdd2013.org/wp-content/uploads/2013/04/copem2013_Pevny.pdf>.

Tomas Pevny, "Loda: Lightweight on-line detector of anomalies," Aug. 24, 2015, pp. 1-31, Available at: <agents.fel.cvut.cz/stegodata/pdfs/Pev15-Loda.pdf>.

Wikipedia, Kernel density estimation (last modified Dec. 12, 2016) (13 pages).

Wikipedia, k-nearest neighbors algorithm (last modified Feb. 10, 2017) (17 pages).

Wikipedia, Locality-sensitive hashing (last modified Feb. 17, 2017) (11 pages).

Wikipedia, Principal component analysis (last modified Feb. 15, 2017) (40 pages).

Zhana, "K-ns: Section-based Outlier Detection in High Dimensional Space," 2012, pp. 1-12, Available at: <arxiv.org/ftp/arxiv/papers/1405/1405.1027.pdf>.

\* cited by examiner

MULTI-DIMENSIONAL DATA SAMPLES REPRESENTING ANOMALOUS ENTITIES

BACKGROUND

A computing environment can include a network of computers and other types of devices. Issues can arise in the computing environment due to behaviors of various entities. Monitoring can be performed to detect such issues, and to take action to address the issues.

BRIEF DESCRIPTION OF THE DRAWINGS

Some implementations of the present disclosure are described with respect to the following figures.

Figure 1:
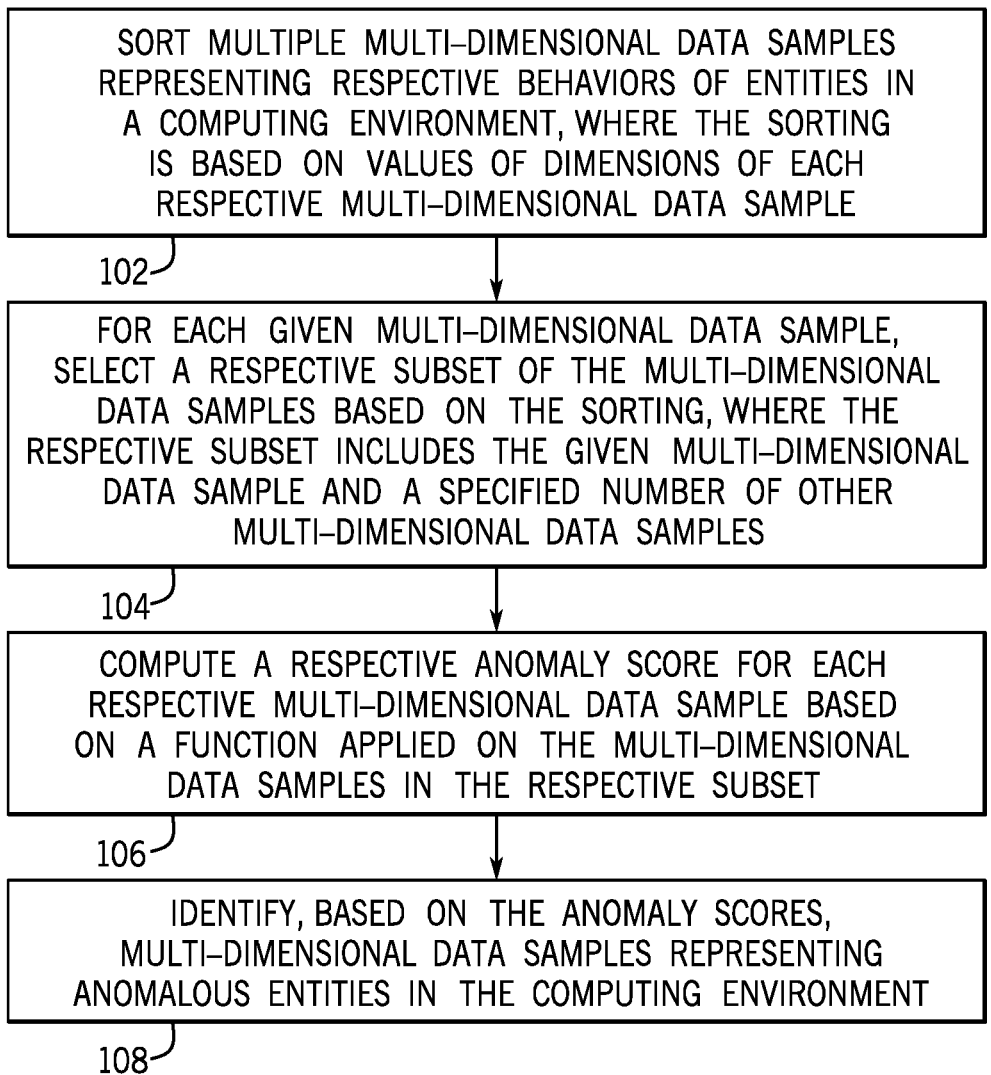
FIG. 1 is a flow diagram of an anomaly detecting process according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain behaviors of entities in a computing environment can be considered anomalous. Examples of entities can include users, machines (physical machines or virtual machines), programs, sites, network addresses, network ports, countries, states, cities, or any other identifiable element that can exhibit a behavior including actions in the computing environment. A behavior of an entity can be anomalous if the behavior deviates from an expected rule, criterion, threshold, policy, past behavior of the entity, behavior of other entities, or any other target, which can be predefined or dynamically set. An example of an anomalous behavior of a user involves the user making greater than a number of login attempts into a computer within a specified time interval, or a number of failed login attempts by the user within a specified time interval. An example of an anomalous behavior of a machine involves the machine receiving greater than a threshold number of data packets within a specified time interval, or a number of login attempts by users that exceed a threshold within a specified time interval.

In some examples, behaviors of entities can be represented by aggregating events occurring in a computing environment. Events are represented by event records that can be collected in a log, such as domain name system (DNS) server logs, Web-Proxy server logs, application logs, and so forth. Collected event records can relate to normal operations in the computing environment, or abnormal operations in the computing environment, such as operations exhibiting faults or errors associated with machines or programs, operations raising security issues (e.g., unauthorized access of data, programs, or machines by users or programs, malware intrusions, denial-of-service attacks, etc.), or operations raising other issues that indicate that problems may be present in the computing environment that can prevent the computing environment or users of the computing environment from achieving target operations or goals. Event records can be aggregated by entity and by time interval to produce aggregated records (also referred to as data samples in the ensuing disclosure) that represent behaviors of respective entities. For example, event records relating to user A in a specific 30-minute time interval can be aggregated to produce an aggregated record (or data sample) for user A, where the aggregated record (or data sample) can include multiple dimensions. Each of the dimensions can represent some attribute of entity behavior, such as number of login attempts, number of failed login attempts, number of packets received, number of non-existent-domain replies on DNS requests, maximum length of accessed web addresses, number of strange character combinations on web addresses accessed, number of anti-virus alerts, total time-to-live, number of incoming and outgoing bytes, and so forth.

In some examples, scores or other indications (referred to as anomaly scores or anomaly indications) can be computed for data samples representing entities in the computing environment, where the anomaly scores can be used to determine whether a given data sample represents an anomalous entity. The anomaly scores can be based on computing a similarity matrix, where each entry $S_{ij}$ of the similarity matrix represents a similarity (according to some measure) between entity i and entity j. In some examples, each entry $S_{ij}$ of the similarity matrix has a value between 0 and 1, where 0 means the entities are completely dissimilar, and 1 means the entities are identical. One way of using the similarity matrix for anomaly scoring is to add the entries in each row of the similarity matrix, where the sum (referred to as a "density" as explained further below) can be used to identify anomalous entities. However, the time to compute the similarity matrix increases quadratically (as a power of 2) as the number of entities increases.

As a result, computing anomaly scores using some example techniques can be computationally expensive in terms of computational time and computational resources. In accordance with some implementations of the present disclosure, anomaly scores or other indications can be computed in a computationally more efficient manner, by projecting multi-dimensional data samples onto a one-dimensional (1-D) space, and using the projecting to select a subset of multi-dimensional data samples that can then be used to compute a respective anomaly score or other indication for a given multi-dimensional data sample. The projecting of the data samples onto a 1-D space effectively projects the data samples as points on the line, where positions of the points on the line define an order of the data samples along the line. Based on such order, a sorted collection of the data samples (based on the projecting) can be determined, and anomaly scoring can be based on the sorted collection of data samples.

FIG. 1 is a flow diagram of an example process of anomaly detection, in accordance with some examples, which can be performed by a system, such as a computer or an arrangement of computers. The process sorts (at 102)

multiple multi-dimensional data samples representing respective behaviors of entities in a computing environment, where the sorting is based on values of dimensions of each respective multi-dimensional data sample. As noted above, the sorting can be based on projecting the multi-dimensional data samples onto a 1-D space.

The process of FIG. 1 is performed to compute anomaly scores (or more generally anomaly indications) for each of the multi-dimensional data samples. The anomaly indication computed for each multi-dimensional data sample is computed based on a respective selected subset of data samples.

For each given multi-dimensional data sample, the process of FIG. 1 selects (at 104) a respective subset of the multi-dimensional data samples based on the sorting (performed at 102), where the respective subset includes the given multi-dimensional data sample and a specified number of other multi-dimensional data samples. By projecting the multi-dimensional data samples onto a 1-D space and selecting a subset of multi-dimensional data samples on which further processing is applied, solutions can be provided to compute anomaly scores that have linear complexity, as opposed to quadratic complexity. A solution with quadratic complexity refers to a solution that performs on the order of $N^2$ computations given N data samples. A solution with linear complexity refers to a solution that performs on the order of N computations given N data samples.

The process of FIG. 1 computes (at 106) a respective anomaly score for each respective multi-dimensional data sample based on a function applied on the multi-dimensional data samples in the respective subset. The function that is applied on the multi-dimensional data samples in the respective subset can be any of various different functions. In some examples, the functions can include kernels that are further explained below.

The process of FIG. 1 further identifies (at 108), based on the anomaly scores, multi-dimensional data samples representing anomalous entities in the computing environment.

Effectively, in some examples, instead of producing an entire similarity matrix to compute anomaly scores (or other anomaly indications), solutions are able to produce just a portion of the similarity matrix, where anomaly scores (or other anomaly indications) are computed based on just the portion of the similarity matrix (rather than an entire similarity matrix), which is computationally more efficient. The portion of the similarity matrix to be computed is selected based on an order that is obtained by projecting the data samples into 1-D space.

Figure 2:
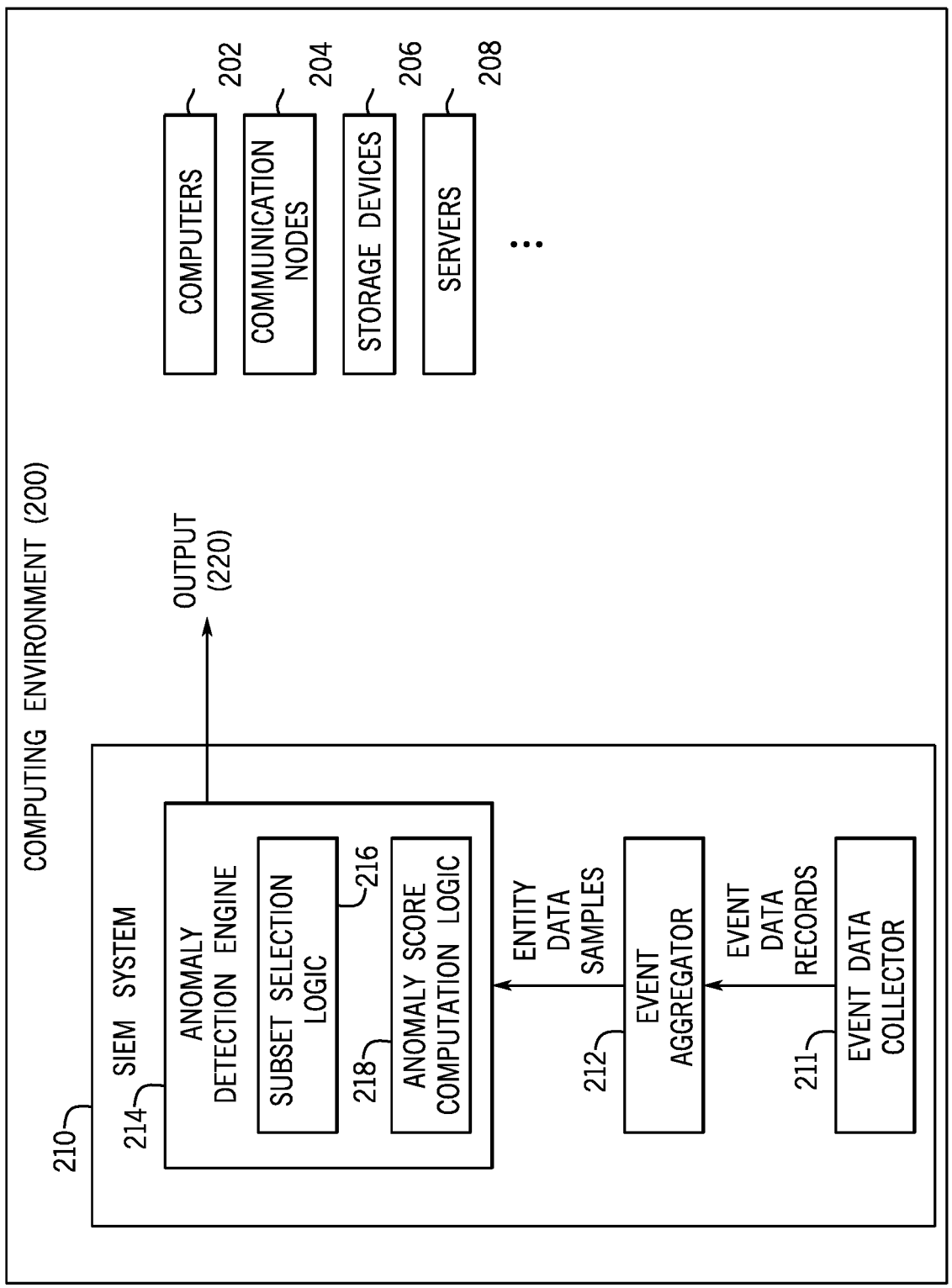
FIG. 2 is a block diagram of a computing environment including an anomaly detection engine according to some examples.

FIG. 2 is a block diagram of an example computing environment 200, which includes computers 202, communication nodes 204 (e.g., switches, routers, etc.), storage devices 206, servers 208, and/or other types of electronic devices. The computing environment 200 can be a data center, an information technology (IT) infrastructure, a cloud system, or any other type of arrangement that includes electronic devices.

The computing environment 200 also includes a security information and event management (SIEM) system 210, which can refer generally to an infrastructure, made up of hardware equipment and machine-readable instructions (software and/or firmware), that is able to collect data relating to events in the computing environment 200, and to generate security alerts in response to the collected event data. For example, the SIEM system 210 can discover users and/or other entities (such as machines, IP addresses, sites, etc.) that are anomalous in their behavior, compared to either other users or entities or to previous behaviors of themselves.

Although reference is made to an SIEM system in some examples, it is noted that in other examples, solutions according to some implementations can be applied to other types of systems relating to detecting anomalous entities in relation to other issues that may be present in the computing environment 200, where such issues can affect the performance of the computing environment 200 or can cause the computing arrangement to exhibit errors or violate policies, rules, and so forth.

The SIEM system 210 includes an event data collector 211 to collect data relating to events associated with the various electronic devices of the computing environment 200. The event data collector 211 can include collection agents distributed throughout the computing environment 200, such as on the computers 202, communication nodes, storage devices 206, servers 208, and so forth. The event data collector 211 outputs event data records.

In further examples, data records of events can be collected into logs.

Examples of events can include login events, events relating to loading of programs, events relating to execution of programs, events relating to accesses made of components of the computing environment 200, errors reported by machines or programs, events relating to performance monitoring of various characteristics of the computing environment 200, including monitoring of network communication speeds, execution speeds of programs, and so forth.

Event data records collected by the event data collector 211 can include attributes associated with each event, where attributes can include any or some combination of the following: an identifier or name of an entity (machine or program) associated with the event (e.g., the entity that triggered the event, the entity on which an activity was occurring when the event occurred, etc.), a type of operating system associated with the event, a type of application program associated with the event, a network address associated with the event, a port number used in a communication, an identifier of a user involved in the event, a job function of a user, a location of a user, a department for which a user works, a signature of a malware, and so forth.

An event aggregator 212 aggregates the event data records, where the aggregating groups the event data records by entity and by time interval, and within each group of event data records, values of dimensions are computed by aggregating over the attributes of the event data records. The event aggregator 212 produces entity data samples (such as the multi-dimensional data samples discussed above) that represent respective behaviors of respective entities.

The entity data samples are provided by the event aggregator 212 to an anomaly detection engine 214. The anomaly detection engine 214 includes a subset selection logic 216 that selects, for each respective data sample from the event aggregator 212, a respective subset of data samples based on sorted data samples that have been sorted according to projections of the data samples onto a 1-D space. The anomaly detection engine 214 further includes an anomaly score computation logic 218 to compute an anomaly score for each data sample based on the respective subset of data samples, as discussed above.

The anomaly detection engine 214 can be implemented as a hardware processing circuit, which can include any or some combination of the following: a microprocessor, a core of a multi-core microprocessor, a microcontroller, a programmable gate array, a programmable integrated circuit device, or another hardware processing circuit. Alternatively, the anomaly detection engine 214 can be implemented as a combination of a hardware processing circuit and machine-readable instructions (software or firmware) executable on the hardware processing circuit.

Each of the subset selection logic 216 and the anomaly score computation logic 218 can also be implemented as a hardware processing circuit or as a combination of a hardware processing circuit and machine-readable instructions.

The anomaly detection engine 214 can provide an output 220, which can include the anomaly scores computed by the anomaly score computation logic 218. Alternatively or additionally, the anomaly detection engine 214 can identify in the output 220 data samples that are representative of anomalous entities, based on the anomaly scores.

Specific Examples of Computing Anomaly Scores

The following provides further details regarding processes according to some examples, such as processes according to FIG. 1 or processes that can be performed by the anomaly detection engine 214.

Let $\{\vec{x}_i\}=1, \ldots, N$, be a collection of entity data samples in a d-dimension space, where $d>1$. Each data sample, $\vec{x}_i$, has d dimensions representing respective attributes such as discussed further above. In each data sample, each dimension has a numerical value. For each data sample, an anomaly score (e.g., a non-negative real number) is computed (such as in task 106 of FIG. 1) to represent its abnormality.

As noted above, solutions according to some examples project each d-dimensional sample $\vec{x}_i$ into a 1-D space characterized by a given 1-D vector $\vec{s}$. This projection can be expressed as:

$$p_i = \vec{s} \cdot \vec{x}_i \quad \text{(Eq. 1)}$$

The 1-D vector $\vec{s}$ can be arbitrarily selected in some examples. Generally, the 1-D vector $\vec{s}$ can generally represent a line pointing in some direction. In some examples, the 1-D vector $\vec{s}$ can be computed using a principal component analysis (PCA) or some other optimization technique.

In Eq. 1, the parameter, $p_i$, represents a point on a line due to the projection of the data sample $\vec{x}_i$ onto the line. A position of a point corresponding to the data sample $\vec{x}_i$ on the line determines an order of the data sample $\vec{x}_i$ relative to other data samples that have also been projected onto the line.

In the ensuing discussion, it is assumed for the sake of simplicity that the 1-D vector $\vec{s}$ is a (non-normalized) unitary d-dimensional vector $\vec{1}=(1, \ldots, 1)$. In this simplified example, the projection, $p_i$, is calculated as:

$$p_i = \sum_{\ell=1}^{d} x_{i\ell}, \quad \text{(Eq. 2)}$$

where $x_{i\ell}$ is the $\ell^{th}$ element of the vector $\vec{x}_i$ that represents a d-dimensional data sample. Each element $x_{i\ell}$ represents a respective different dimension of the d dimensions represented by the vector $\vec{x}_i$.

Once the projection of each data sample is available (computed according to Eq. 1 or 2), the data samples are sorted according to the projection points, $p_i$, on the line. Consider a mapping, r: index of a data sample→the data sample's index after sorting. In the mapping, r, the index of the data sample is its index in the originally received stream of data samples, e.g., in a stream of data samples, $\vec{x}_1$, $\vec{x}_2, \ldots$, the index of the data samples is 1, 2, ..., respectively. Moreover, in the mapping r, the data sample's index after sorting is the index of the data sample after the projection onto the line. For example, if $\vec{x}_{426}$ (where 426 is the index of the data sample prior to sorting) has the smallest projection $p_{426}$ in the data, then r(426)=1 (where 1 is the data sample's index after sorting).

The sorting of the data samples based on the projection allows for data samples that are similar to be closer to one another. Data samples that are projected onto points close to each other on the line have a relatively large chance of being similar to one another, in some examples. Note that entity data samples that are received (such as by the anomaly detection engine 214 of FIG. 2), can have some arbitrary order, such as the order in which the entities show up in the logs. More generally, it is unlikely that the received entity data samples are in an order based on similarities between entities. By performing the projection and associated sorting according to some implementations of the present disclosure, an order of the entity data samples can be derived that relates to similarities between entities.

For each data sample, $\vec{x}_i$, a subset of indexes of data samples, C(i), is identified, according to Eq. 3 below, where the subset, C(i), includes 2B+1 (a positive integer) indexes of data samples:

$$C(i)=\{c|r(c)-B \le r(i) \le r(c)+B\}, \quad \text{(Eq. 3)}$$

where B<<N (N represents the total number of data samples). In other words, C(i) is the set of the indices of the 2B+1 samples that are closest to $\vec{x}_i$ after projection and sorting. The subset of data samples corresponding to C(i) include the following data samples: the data sample, $\vec{x}_i$, under consideration, a predetermined number (B) of sorted data samples before the data sample, $\vec{x}_i$, under consideration, and the predetermined number (B) of sorted data samples after the data sample, $\vec{x}_i$, under consideration.

A density of each data sample, $\vec{x}_i$, is computed according to Eq. 4 below:

$$d_i = \sum_{j \in C(i)} K(\vec{x}_i - \vec{x}_j), \quad \text{(Eq. 4)}$$

In Eq. 4, the density, $d_i$, is computed based on just data samples in the selected subset of data samples corresponding to C(i). This is contrasted to examples where the density, $d_i$, is computed based on an entire row of a similarity matrix, which is computationally more expensive than computing the density on the selected subset of data samples according to some implementations of the present disclosure. Based on the sorting performed according to some implementations, computing the density on the selected subset of similar data samples increases the likelihood that the computed density is the same as or close to the density computed based on a full similarity matrix.

In Eq. 4, K( ) represents a function that is applied on the data samples of the subset of data samples represented by C(i). The function $K(\vec{x})$ can be a radially-monotonous kernel with maximum of $\vec{x}=\vec{0}$, and $K(\vec{0})=1$. One example of such a kernel is the Gaussian kernel:

$$K(\vec{x}) = K_\sigma(\vec{x}) = \exp(-\|\vec{x}\|^2/\sigma^2) \quad \text{(Eq. 5)}$$

for some given standard deviation σ. A more localized example of the kernel is given by:

$$K(\vec{x}) = \begin{cases} K_\sigma(\vec{x}), & \text{if } K_\sigma(\vec{x}) \geq 0.5 \\ 0, & \text{otherwise} \end{cases} \quad \text{(Eq. 6)}$$

Although specific examples of kernels are noted above, it is noted that in other examples, other kernels or other functions can be applied on the data samples of each subset.

In computing the density, $\tilde{d}_i$, according to Eq. 4, $K(\vec{x}_i - \vec{x}_j)$ can be perceived as the similarity between data samples $\vec{x}_i$ and $\vec{x}_j$. Thus, the kernel function, $K(\ )$, when applied to a difference between data samples can represent the similarity between the data samples. When the data samples $\vec{x}_i$ and $\vec{x}_j$ are similar to each other (i.e., the values of the dimensions of the data samples are close to each other), then $K(\vec{x}_i - \vec{x}_j)$ is close to 1. However, if the data samples are not similar to one another, then $K(\vec{x}_i - \vec{x}_j)$ is close to 0. Consequently, the summation of the similarity values, represented by $K(\vec{x}_i - \vec{x}_j)$, in Eq. 4 for a given data sample correlates roughly to the number of similar data samples.

In some examples, the minimum value of the density, $d_i$, is 1, and this is obtained for the most anomalous samples. The larger the value of the density the more pervasive and common the sample is (and thus not considered to be anomalous).

An anomaly score can be computed from the density, $d_i$, as follows:

$$\vec{a}_i = \exp(1 - d_i). \quad \text{(Eq. 7)}$$

The anomaly score, $\vec{a}_i$, returns small values for high density data samples (the less anomalous data samples), and returns large values for low density data samples 9the more anomalous data samples).

In other examples, the density, $d_i$, of a data sample, $\vec{x}_i$, can be used as the anomaly score. In further examples, other types of anomaly scores can be used.

Normalization

In the above, the different dimensions (assuming there are d dimensions) of each data sample $\vec{x}_i$ are not normalized. As a consequence, procedures that involve the combination of the different dimensions (e.g., such as the computation of the similarity term $K(\vec{x}_i - \vec{x}_j)$ and the projection $\vec{s} \cdot \vec{x}_i$) assume the same weight for every dimension. This can pose an issue when some dimensions numerically dominate other dimensions (e.g., for example, a first dimension can have a maximum value that is much larger than a maximum value of a second dimension). In this case, the analysis is effectively performed on the dominating dimensions only, while contributions of the other dimensions are ignored or suppressed.

To address the foregoing issues, normalization of dimensions can be performed.

Let $\sigma_l$, $\ell = 1, \ldots, d$, be the variance of the dimension l:

$$\sigma_\ell = \frac{1}{N} \sum_{i=1}^{N} (x_{i\ell} - \bar{x}_{i\ell})^2, \quad \text{(Eq. 8)}$$

where $\bar{x}_{il}$ is the mean of values of the dimension, $x_{il}$, in the N data samples.

Based on the variance, $\sigma_l$, of the dimension, $x_{il}$, a normalized data sample, $\vec{x}_i'$, can be computed according to Eq. 9 to produce normalized samples $\{\vec{x}_i'\}$:

$$\vec{x}_i' = \left(\frac{x_{i0}}{\sigma_0}, \frac{x_{i1}}{\sigma_1}, \ldots, \frac{x_{id}}{\sigma_d}\right). \quad \text{(Eq. 9)}$$

According to Eq. 9, in each normalized data sample, each dimension is computed by dividing the value of the dimension, $x_{il}$, by the respective variance, $\sigma_l$.

The normalized data samples can then be used in the processes discussed herein to compute anomaly scores.

In further examples, the variances, $\sigma_0, \sigma_1, \ldots, \sigma_d$, do not have to be computed on the set of data samples under analysis. For example, variances can be computed on a typical set of data samples, and then used for other sets of data samples that are being analyzed. For instance, if a solution computes the anomaly score on data samples that arrive once a day, then the solution can compute a set of variances based on data samples received on a first day of the week, and this set of variances can be used for the remaining days of the week. This makes sense if the statistics of the data do not change (much) from one day to another. Alternatively, a solution can produce a special set of data samples with no (or with little) anomalies, compute the set of variances from that special set of samples, and then reuse the set of variances for other sets of data samples.

More elaborate analytics can be performed for the determination of the variances. For instance, a set of dimensions can be clustered into different clusters of dimensions, and then the average cluster variance can be used as the variance for a respective dimension. This can accentuate the intra-cluster dissimilarities. It makes sense to undergo such elaborate analysis if the computed set of variances are reused for many succeeding sets of samples.

Anomaly Detection

The goal of anomaly detection is to identify a subset of data samples that are anomalous (i.e., represent anomalous entities). In some examples, the identification of a subset of data samples that are anomalous can be performed by sorting the data samples according to their anomaly scores in a descending order (or ascending order). A specified threshold can be specified to select data samples with anomaly scores that have a specified relationship with respect to the threshold (e.g., anomaly scores greater than the threshold, or anomaly scores less than the threshold, depending on the type of anomaly score used).

The threshold can be user defined or automatically generated.

In further examples, in addition to being able to identify data samples that represent anomalous entities, solutions can also indicate which dimension(s) of each such anomalous data samples contributed most to the indication that the data sample is anomalous.

For each of the anomalous data samples (e.g., those data samples that have anomaly scores higher than the specified threshold), the solution can compute dimension densities as follows. The density of the $l^{th}$ dimension, $\tilde{d}_i^{(\ell)}$ for a normalized data sample, $\vec{x}_i'$, is defined as:

$$\tilde{d}_i^{(\ell)} = \sum_{j=1}^{N} K_\sigma^\ell(\vec{x}_i' - \vec{x}_j'), \quad \text{(Eq. 10)}$$

where $K_\sigma^l$ is the same kernel as K, but is applied only to the $\ell^{th}$ dimension, that is, if $\vec{1}_l$ is the indicator vector (0, 0, ..., 1, ..., 0), where the 1 is at the $\ell^{th}$ position, then:

$$K_\sigma^\ell(\vec{x}) = K_\sigma(\vec{x} \cdot \vec{1}_\ell) = \exp(-|x'_\ell|^2/\sigma^2). \quad \text{(Eq. 11)}$$

Once the densities $\tilde{d}_i^{(\ell)}$ are computed for all the dimensions, the densities are compared to the original overall density $\tilde{d}_i$ of the normalized data sample, $\vec{x}_i'$. Those dimensions for which $\tilde{d}_i^{(l)} \leq \tilde{d}_i$ are declared the anomalous dimensions of the normalized data sample, $\vec{x}_i'$.

Figure 3:
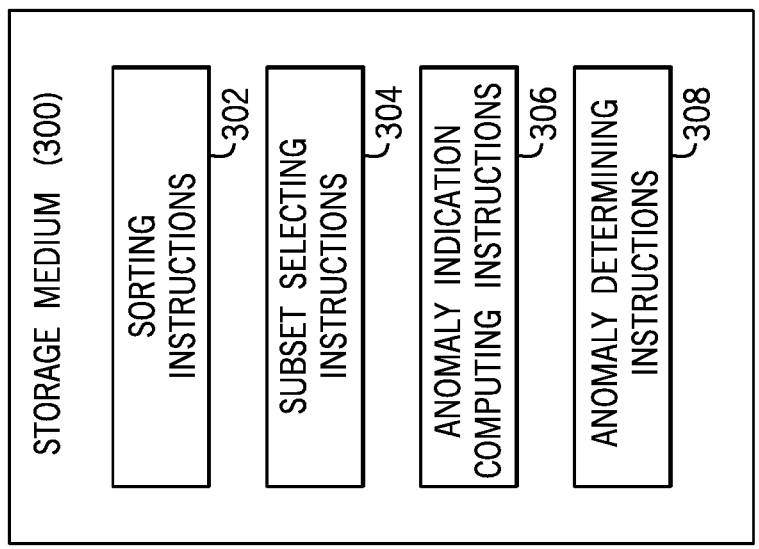
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks, such as those described in the present disclosure. The machine-readable instructions include sorting instructions 302 to sort multi-dimensional data samples representing respective behaviors of entities in a computing environment, where the sorting is based on values of dimensions of each respective multi-dimensional data sample.

The machine-readable instructions further include subset selecting instructions 304 to, for a given multi-dimensional data sample, select a subset of the multi-dimensional data samples based on the sorting. The machine-readable instructions further include anomaly indication computing instructions 306 to compute an anomaly indication for the given multi-dimensional data sample based on applying a function on the multi-dimensional data samples in the subset.

The machine-readable instructions further include anomaly determining instructions 308 to determine whether the given multi-dimensional data sample represents an anomalous entity in the computing environment based on the computed anomaly indication.

Figure 4:
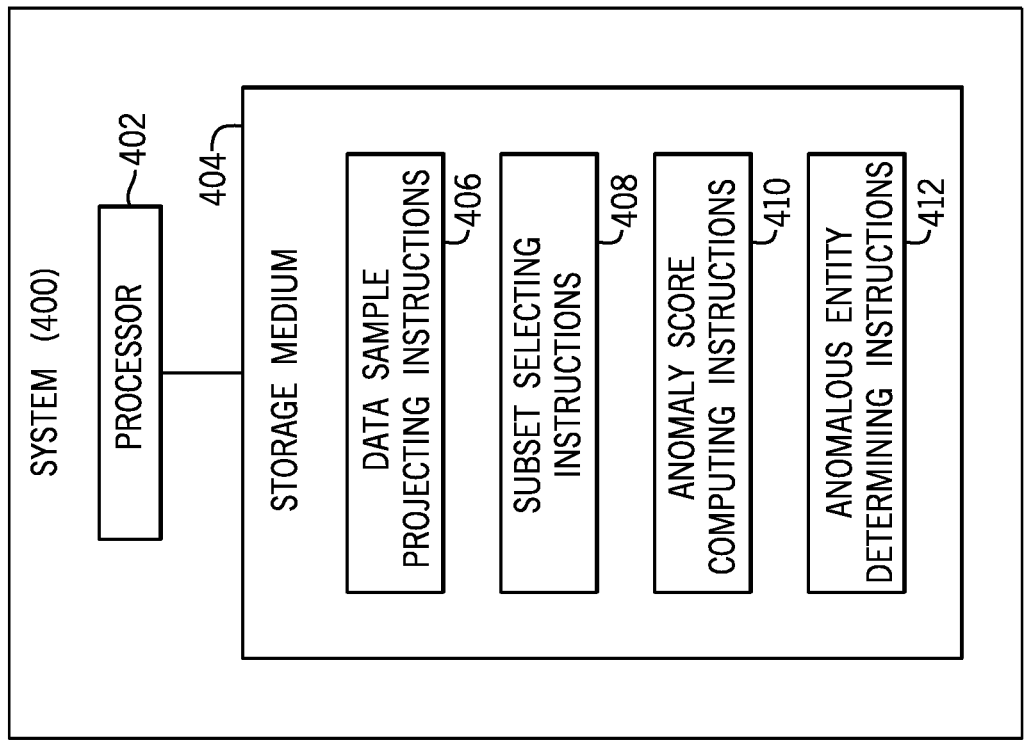
FIG. 4 is a block diagram of a system according to further examples.

FIG. 4 depicts a system 400 that includes a processor 402 (or multiple processors), and a storage medium 404 storing instructions executable on the processor 402 to perform various tasks. Instructions executable on a processor can refer to instructions executable on one processor or instructions executable on multiple processors. A processor can include a microprocessor, a core of a multi-core microprocessor, a microcontroller, a programmable integrated circuit, a programmable gate array, or another hardware processing circuit.

The storage medium 404 stores data sample projecting instructions 406 to project multi-dimensional data samples representing respective behaviors of entities in a computing environment to a one-dimensional space, the projecting producing a sorted order of the data samples. The storage medium 404 further stores subset selecting instructions 408 to select, for a given multi-dimensional data sample, a subset of multi-dimensional data samples from the sorted data samples.

The storage medium 404 further stores anomaly score computing instructions 410 to compute an anomaly score for the given multi-dimensional data sample based on applying a function on the multi-dimensional data samples in the subset. The storage medium 404 further stores anomalous event determining instructions 412 to determine whether the given multi-dimensional data sample represents an anomalous entity in the computing environment based on the computed anomaly score.

The storage medium 300 of FIG. 4 or 404 of FIG. 4 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory storage medium storing instructions that upon execution cause a system to:
    sort a plurality of multi-dimensional data samples representing respective behaviors of entities in a computing environment, wherein the sorting is based on values of dimensions of each multi-dimensional data sample of the plurality of multi-dimensional data samples, and the sorting comprises projecting the plurality of multi-dimensional data samples representing the respective behaviors of the entities onto a one-dimensional space, wherein a position of a respective multi-dimensional data sample of the plurality of multi-dimensional data samples as projected onto the one-dimensional space is based on an aggregation of the values of the dimensions of the respective multi-dimensional data sample, and the projecting causes projection of multi-dimensional data samples that are similar to one another onto points closer to each other in the one-dimensional space;
    for a given multi-dimensional data sample, select a subset of the plurality of multi-dimensional data samples based on the sorting;
    compute an anomaly indication for the given multi-dimensional data sample based on applying a function on the multi-dimensional data samples in the subset, the function to calculate a similarity between the multi-dimensional data samples in the subset based on differences between the multi-dimensional data samples in the subset; and
    detect an anomalous entity in the computing environment, the detecting comprising determining whether the given multi-dimensional data sample represents the anomalous entity based on the computed anomaly indication.

2. The non-transitory storage medium of claim 1, wherein the sorting is based on an order of points corresponding to the plurality of multi-dimensional data samples projected onto a line in the one-dimensional space, wherein the position of the respective multi-dimensional data sample of the plurality of multi-dimensional data samples as projected onto the line is based on the aggregation of the values of the dimensions of the respective multi-dimensional data sample.

3. The non-transitory storage medium of claim 2, wherein the sorting of the plurality of multi-dimensional data samples produces sorted multi-dimensional data samples, and wherein selecting the subset of the plurality of multi-dimensional data samples comprises selecting a group of the sorted multi-dimensional data samples that include the given multi-dimensional data sample.

4. The non-transitory storage medium of claim 3, wherein the group of the sorted multi-dimensional data samples that include the given multi-dimensional data sample further comprises a predetermined number of the sorted multi-dimensional data samples before the given multi-dimensional data sample in the one-dimensional space, and the predetermined number of the sorted multi-dimensional data samples after the given multi-dimensional data sample in the one-dimensional space.

5. The non-transitory storage medium of claim 2, wherein the subset comprises multi-dimensional data samples that are determined to be similar to one another based on the order of the points corresponding to the plurality of multi-dimensional data samples projected onto the line.

6. The non-transitory storage medium of claim 1, wherein the instructions upon execution cause the system to:
compute a variance of each dimension of the plurality of multi-dimensional data samples to produce respective computed variances; and
normalize the dimensions of each multi-dimensional data sample based on the respective computed variances.

7. The non-transitory storage medium of claim 1, wherein the computed anomaly indication comprises an anomaly score, and the instructions upon execution cause the system to:
compute anomaly scores for other multi-dimensional data samples of the plurality of multi-dimensional data samples; and
identify a number of the plurality of multi-dimensional data samples that represent anomalous entities based on the computed anomaly scores.

8. A system comprising:
a processor; and
a non-transitory storage medium storing instructions that when executed cause the processor to:
project a plurality of multi-dimensional data samples representing respective behaviors of entities in a computing environment to a one-dimensional space, the projecting producing a sorted order of the multi-dimensional data samples in the one-dimensional space, wherein a position of a respective multi-dimensional data sample of the plurality of multi-dimensional data samples as projected onto the one-dimensional space is based on an aggregation of values of dimensions of the respective multi-dimensional data sample, and the projecting causes projection of multi-dimensional data samples that are similar to one another onto points closer to each other in the one-dimensional space;
for a given multi-dimensional data sample, select a subset of multi-dimensional data samples from the sorted order of the multi-dimensional data samples;
compute an anomaly score for the given multi-dimensional data sample based on applying a function on the multi-dimensional data samples in the subset, the function to calculate a similarity between the multi-dimensional data samples in the subset based on differences between the multi-dimensional data samples in the subset; and
detect an anomalous entity in the computing environment, the detecting comprising determining whether the given multi-dimensional data sample represents the anomalous entity based on the computed anomaly score.

9. The system of claim 8, wherein the instructions when executed cause the processor to:
for another multi-dimensional data sample, select a further subset of multi-dimensional data samples from the sorted order of the multi-dimensional data samples;
compute a further anomaly score for the another multi-dimensional data sample based on applying the function on the multi-dimensional data samples in the further subset; and
determine whether the another multi-dimensional data sample represents an anomalous entity in the computing environment based on the further anomaly score.

10. The system of claim 9, wherein the instructions when executed cause the processor to further:
for the given multi-dimensional data sample, compute measures of respective dimensions of the given multi-dimensional data sample; and
identify, based on the measures of the respective dimensions of the given multi-dimensional data sample, at least one dimension of the respective dimensions of the given multi-dimensional data sample that contributed more to causing the given multi-dimensional data sample to represent the anomalous entity.

11. The system of claim 8, wherein selecting the subset comprises selecting a group of the sorted order of the multi-dimensional data samples that include the given multi-dimensional data sample, a specified number of first multi-dimensional data samples before the given multi-dimensional data sample in the one-dimensional space, and the specified number of second multi-dimensional data samples after the given multi-dimensional data sample in the one-dimensional space.

12. A method comprising:
sorting, by a system comprising a processor, a plurality of multi-dimensional data samples representing respective behaviors of entities in a computing environment, wherein the sorting is based on values of dimensions of each multi-dimensional data sample of the plurality of multi-dimensional data samples, and the sorting comprises projecting the plurality of multi-dimensional data samples onto a one-dimensional space, wherein a position of a respective multi-dimensional data sample of the plurality of multi-dimensional data samples as projected onto the one-dimensional space is based on an aggregation of the values of the dimensions of the respective multi-dimensional data sample, and the projecting causes projection of multi-dimensional data samples that are similar to one another onto points closer to each other in the one-dimensional space;
for a given multi-dimensional data sample of the plurality of multi-dimensional data samples, selecting, by the system, a subset of the plurality of multi-dimensional data samples based on the sorting, the subset including the given multi-dimensional data sample and a specified number of other multi-dimensional data samples;

computing, by the system, a an anomaly score for the given multi-dimensional data sample based on a function applied on the multi-dimensional data samples in the subset, the function to calculate a similarity between the multi-dimensional data samples in the subset based on differences between the multi-dimensional data samples in the subset; and detecting an anomalous entity in the computing environment, the detecting comprising identifying, by the system based on the anomaly score, whether the given multi-dimensional data sample represents the anomalous entity.

13. The system of claim 8, wherein the aggregation of the values of the dimensions of the respective multi-dimensional data sample comprises a summation of the values of the dimensions of the respective multi-dimensional data sample.

14. The non-transitory storage medium of claim 1, wherein the aggregation of the values of the dimensions of the respective multi-dimensional data sample comprises a summation of the values of the dimensions of the respective multi-dimensional data sample.

15. The method of claim 12, wherein the aggregation of the values of the dimensions of the respective multi-dimensional data sample comprises a summation of the values of the dimensions of the respective multi-dimensional data sample.

* * * * *